United States Patent [19]

Iwashita et al.

[11] Patent Number: 5,519,810
[45] Date of Patent: May 21, 1996

[54] FUZZY INFERENCE UNIT TO AND FROM WHICH A VOLTAGE VALUE IS INPUT AND OUTPUT

[75] Inventors: Koichi Iwashita; Masanari Oh, both of Fukuoka, Japan

[73] Assignee: Rohm Co., Ltd., Kyoto, Japan

[21] Appl. No.: 86,121

[22] Filed: Jul. 6, 1993

[30] Foreign Application Priority Data

Jul. 10, 1992 [JP] Japan ................................. 4-184142

[51] Int. Cl.$^6$ ........................................ G06F 9/44
[52] U.S. Cl. .................... 395/3; 395/61; 395/900
[58] Field of Search ........................ 395/3, 61, 900

[56] References Cited

U.S. PATENT DOCUMENTS

| | | | |
|---|---|---|---|
| 4,614,866 | 9/1986 | Liss et al. | 250/214 A |
| 4,837,725 | 6/1989 | Yamakawa | 395/3 |
| 5,073,863 | 12/1991 | Zhang | 395/3 |
| 5,121,466 | 6/1992 | Zhang | 395/3 |
| 5,126,600 | 6/1992 | Zhang | 395/900 |
| 5,131,071 | 7/1992 | Tsutsumi et al. | 395/900 |
| 5,142,664 | 8/1992 | Zhang | 395/3 |
| 5,162,657 | 11/1992 | Sturzebecher et al. | 250/551 |
| 5,202,954 | 4/1993 | Miyazawa et al. | 395/3 |
| 5,285,376 | 2/1994 | Struger et al. | 395/12 |
| 5,295,077 | 3/1994 | Fukuoka | 395/900 |
| 5,295,226 | 3/1994 | Yamakawa | 395/900 |
| 5,367,610 | 11/1994 | Ohtsubo et al. | 395/3 |

FOREIGN PATENT DOCUMENTS 0392494  10/1990  European Pat. Off. ............. 395/3

OTHER PUBLICATIONS

Shirai, "Inverted Pendulum Controlled Circuit Using Fuzzy State Memory", IEEE, 22nd Inter. Symposium, May 1992.

Pin, "Autonomous Navigation of a Mobile Robot Using Custom-Designed Qualitative Reasoning VLSI Chips and Boards", IEEE Inter. Conf. on Robotics and Automation, May 1992.

Watanabe et al., "VLSI Fuzzy Chip and Inference Accelerator Board System", Proc. 21st Inter. Sym. Multiple-Valued Logic; 26–29 May 1991.

Peters et al., "Fuzzy Logic Controller with Dynamic Rule Set," IEEE, 11–13, Aug. 1992.

Yamamoto, "A Meaningful Infinite Valued Switching Function," IEEE, 27–29, May 1992.

James R. Symon, Hiroyuki Watanabe, "Single Board for Fuzzy Inference," Feb. 28, 1991.

*Primary Examiner*—George B. Davis
*Attorney, Agent, or Firm*—Oliff & Berridge

[57] ABSTRACT

A fuzzy inference unit to which an input value is applied as a voltage value is provided with a scaling circuit for increasing or decreasing a range of the input value and a shifting circuit for shifting a level of the input value. The fuzzy inference unit generates a defined output as a voltage value. In the input part, an output from a preceding stage of fuzzy inference hardware can be converted into a proper value as an input value to the fuzzy inference unit. In the output part, an output of the fuzzy inference hardware can be converted into a proper value as an input to a following stage. Thus, control suited to specific purposes can be performed.

18 Claims, 4 Drawing Sheets

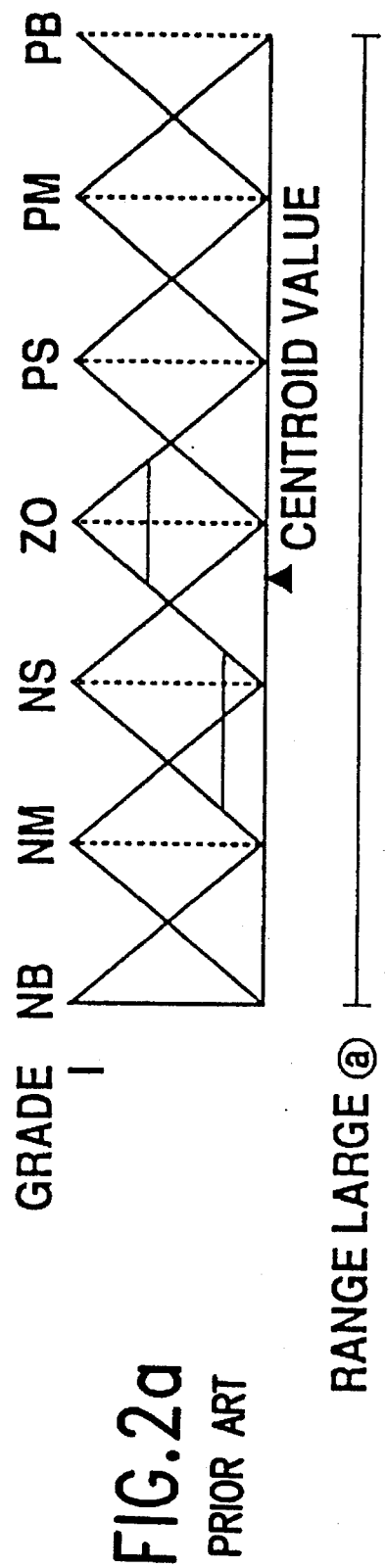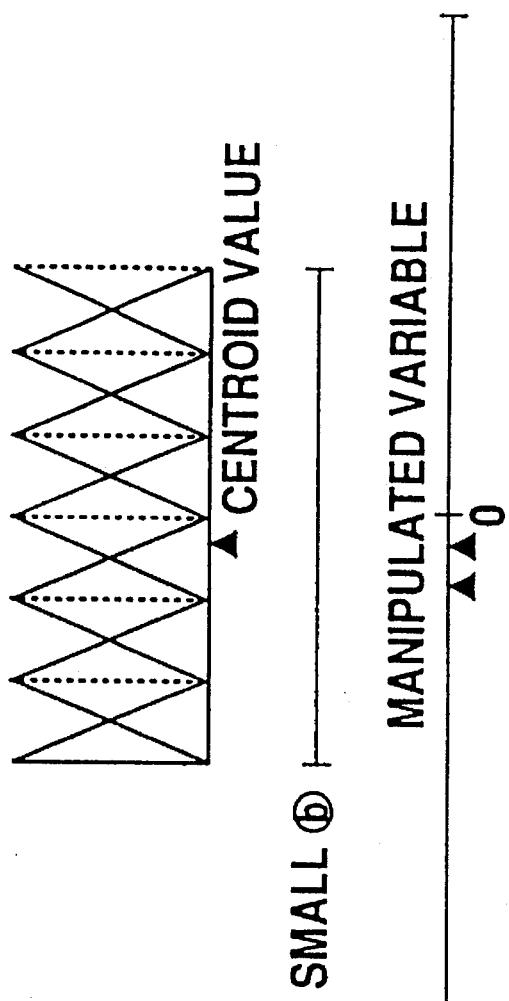
FIG.2a PRIOR ART
FIG.2b PRIOR ART

FUZZY INFERENCE UNIT TO AND FROM WHICH A VOLTAGE VALUE IS INPUT AND OUTPUT

BACKGROUND OF THE INVENTION

1. Field of the Invention

This invention relates to a fuzzy inference unit which makes a fuzzy inference on the basis of uncertain information and knowledge, such as control, pattern recognition, and decision making.

The fuzzy inference is an inference to make a machine perform judgment and processing in a manner similar to a human being on the basis of knowledge containing uncertainty. It can be said to be an inference appropriate for handling qualitative subjectivity.

The fuzzy inference enables you to describe uncertain knowledge such as experience and perception by means of a "fuzzy set" and an "if - then rule" for processing uncertainty numerically. The portion of "if-" is called an antecedent section and the portion of "then-" is called a consequent section. Membership functions of the fuzzy set are used to describe the portions of "-" of the antecedent and consequent sections.

Fuzzy set A is a set characterized by the function $\mu_A$ (membership function)

$$\mu_A : U \rightarrow [0,1]$$

in whole set U. The value $\mu_A$ ($\in [0, 1]$: Any real value ranging from 1 to 0) represents how much the element u ($\in U$) belongs to the fuzzy set A, namely, grade. If the value $\mu_A$ (u) is near 1, it indicates that the grade in which $\mu$ belongs to the fuzzy set A is high; if the value $\mu_A$ is near 0, it indicates that the grade in which $\mu$ belongs to the fuzzy set A is low.

FIG. 1 shows an example of a fuzzy set of an antecedent section. The set labels have the following meanings: NB (negative big) means big in the negative direction; NM (negative medium) means medium in the negative direction; NS (negative small) means small in the negative direction; ZO (zero) means about zero; PS (positive small) means small in the positive direction; PM (positive medium) means medium in the positive direction; and PB (positive big) means big in the positive direction. Although various forms of fuzzy set are possible, triangles and trapezoids as shown in FIG. 1 are often used for actual applications. The fuzzy sets represent uncertain or fuzzy words such as "big", "medium", and "small", and are given names called labels, NB, NM, NS, ZO, PS, PM, and PB, corresponding to the words to be represented. A typical application example of the fuzzy inference is fuzzy control.

Since it is difficult to preset the optimum scale of the fluctuation range of an input signal to a fuzzy inference unit, a control test is normally executed several times for setting and changing the membership function scale. For this reason, the circuit must be changed for each trial and error. If the setup scale is not optimum, the following problem arises: If the input range is wide, an output response to an input change is rapid, resulting in excess control; if the input range is narrow, an output response to an input change is slow.

Thus, scaling of antecedent and consequent sections is important for fuzzy control. This scaling refers to how much the input range and output range of the fuzzy inference unit are to be set.

(1) Antecedent section

As shown in FIG. 1, when the input range is small, even if the same value is input, the effect given to fuzzy control differs as compared with the case in which the input range is large. The case of (a) of FIG. 1 corresponds to membership function PS (positive small) in the antecedent section; that of (b) corresponds to PM (positive medium). That is, when viewed from the membership functions, the case of (b) becomes equivalent to a larger input change than (a), and the manipulated variable as a result of fuzzy control is affected.

(2) Consequent section

On the other hand, the discussion in (1) also applies to the output range of the fuzzy inference unit. If the output range is large as in (a) of FIG. 2, the manipulated variable becomes great; if the output range is small as in (b), the manipulated variable becomes small. Thus, the final manipulated variable varies depending on the input range of the fuzzy inference unit.

Then, for fuzzy control, a problem arises as to how much the input range of the antecedent section and the output range of the consequent section are to be set.

SUMMARY OF THE INVENTION

Accordingly, it is an object of the invention to enable input and output sections of fuzzy inference hardware to perform scaling and level shifting of input and output values.

To the end, according to the invention, there is provided a fuzzy inference unit to which an input value is given as a voltage value, the fuzzy inference unit comprising:

scaling means for enlarging or reducing a scale of the input value; and means for shifting a level of the input value.

The fuzzy inference unit includes the scaling means for changing the voltage range of an input voltage value and the level shift means for adjusting the offset level of the input voltage value, thereby setting the input voltage value to an optimum value to make a fuzzy inference. This eliminates the need for installing an interface, etc., for changing the input voltage value and so the unit can be directly applied to a control system. That is, the fuzzy inference unit is formed as one chip to which a plurality of analog voltage signals are input, thereby providing a desired control signal of the fuzzy inference result.

The output side is provided with scaling means and level shift means, thereby converting an output signal into an analog signal that can be used directly for control, thereby accomplishing preferred control.

Preferably, the scaling means is an amplifier whose amplification factor can be changed, and particularly is an operational amplifier having an inverting input terminal to which an input signal is input and an output terminal which is connected to the inverting input terminal via a feedback resistor whose resistance value can be changed.

Preferably, the level shift means is an operational amplifier having an inverting input terminal to which an output of the scaling means is connected and a non-inverting input terminal to which a predetermined offset voltage that can be changed is supplied.

Preferably, the scaling means and the level shift means are formed by an operational amplifier having a non-inverting input terminal to which an input signal is input, an inverting input terminal to which a predetermined offset voltage that can be changed is supplied, and an output terminal which is connected to the inverting input terminal via a feedback resistor whose resistance value can be changed. In this case, an output signal of the operational amplifier may be output through a buffer amplifier.

BRIEF DESCRIPTION OF THE DRAWINGS

In the accompanying drawings:

FIG. 2 is an illustration showing an example of a consequent section of a conventional fuzzy set;

DESCRIPTION OF THE PREFERRED EMBODIMENTS

Referring now to the accompanying drawings, there are shown preferred embodiments of the invention.

Figure 1A:
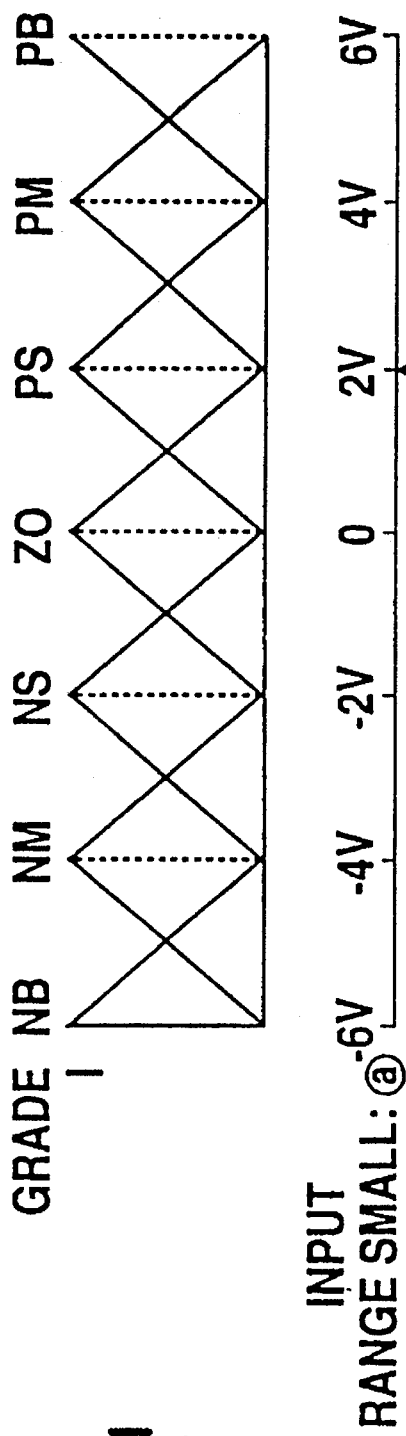
FIG. 1 is an illustration showing an example of an antecedent section of a conventional fuzzy set.
Figure 1B:
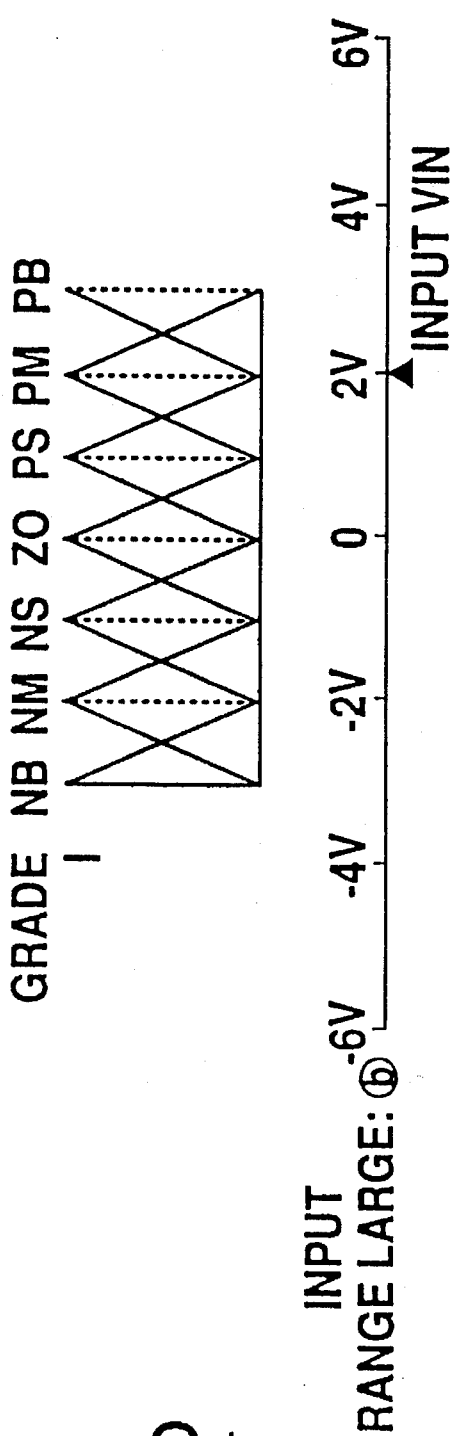
Figure 3:
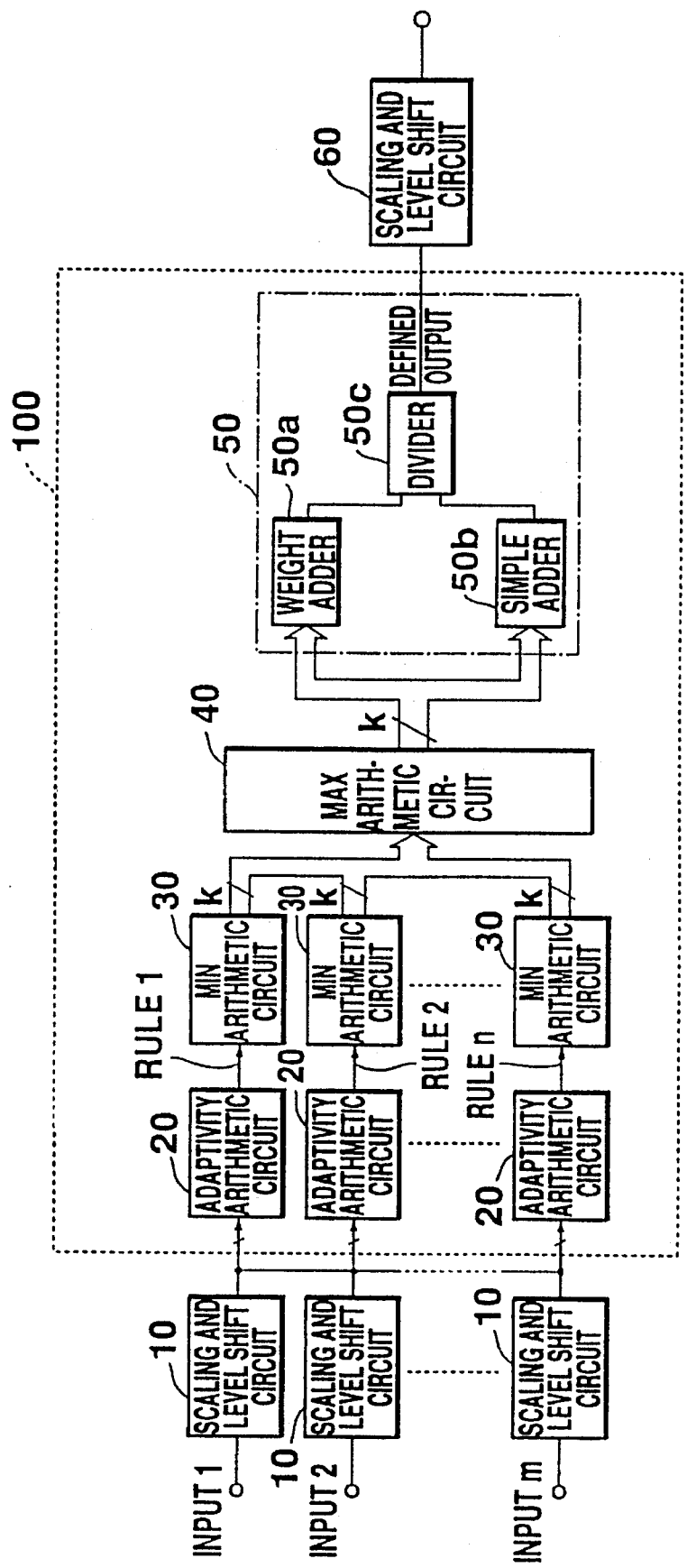
FIG. 3 is a block diagram showing a hardware configuration example of a fuzzy inference unit according to the invention.

FIG. 3 shows an example of the hardware configuration of a fuzzy inference system according to the invention, wherein the MIN-MAX-force placement method is used as an inference method. M input signals of inputs 1 to m are fed into the fuzzy inference system 100. If they do not match inputs of adaptivity arithmetic circuits 20 of the fuzzy inference system 100, they must be matched with each other by some method. As the method, it is necessary to change the range so as to match the controlled object and purpose by using scaling and level shift circuits 10 (described below).

Matched outputs of the m scaling and level shift circuits 10 are input to the n adaptivity arithmetic circuits 20 which then find the adaptivity between the inputs and the antecedent sections of rules 1 to n. Next, minimum value arithmetic circuits 20 calculate the minimum values according to rules with respect to the adaptivity of the antecedent sections for providing the inference results for each of inference rules 1 to n. As many inference results are obtained as the division count k of a base set of each consequent section. The inference results are input to a maximum value arithmetic circuit 40 which has as many input terminals as the division count k of the base set of the consequent section. The maximum value arithmetic circuit 40 then integrates the inference results by calculating the maximum value every k base sets of the consequent section. The integrated inference results are input to a non-fuzzy circuit 50 which consists of a weight adder 50a, a simple adder 50b, and a divider 50c. The circuit 50 then finds the centroid of the integrated inference results and outputs it as the defined output value. This output value is sent to a scaling and level shift circuit 60 at the following stage for consistency when performing control matching of the controlled object and purpose.

Figure 4:
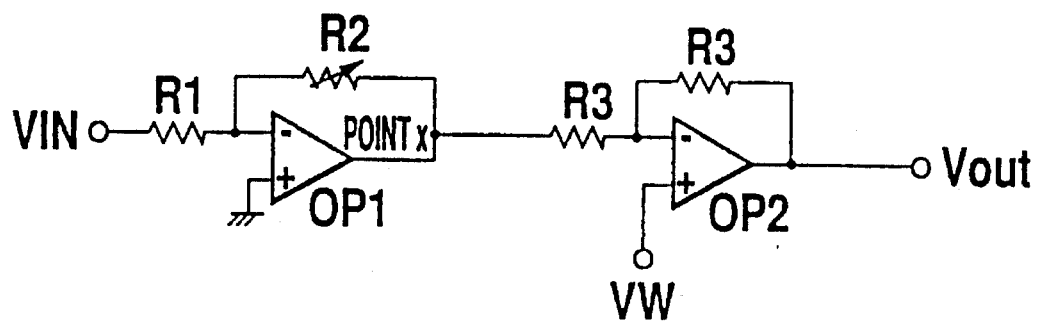
FIG. 4 is a circuit diagram showing a scaling and level shift circuit according to one embodiment of the invention.
Figure 5:
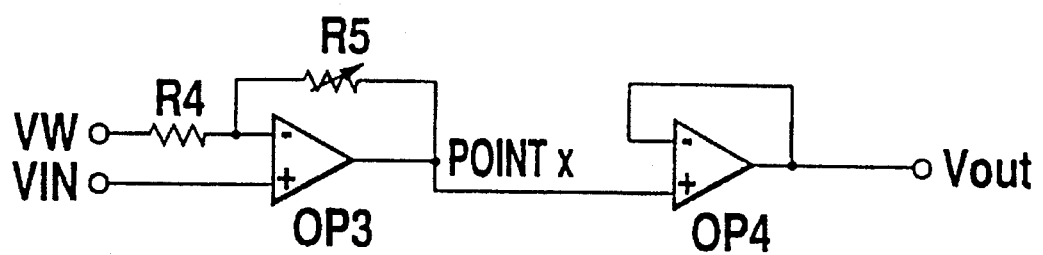
FIG. 5 is a circuit diagram showing a scaling and level shift circuit according to another embodiment of the invention.

FIGS. 4 and 5 show examples of using operational amplifiers to form the hardware for scaling and level shifting of the range of input voltage or defined output voltage; FIG. 4 shows a hardware example using an inverting amplifier circuit and FIG. 5 shows a hardware example using a non-inverting amplifier circuit. The same circuits can be used to form the circuit for scaling and level shifting of the input level range of an antecedent section and the circuit for scaling and level shifting of the output level range of a consequent section.

In the circuit in FIG. 4, the range is determined by the ratio of R2 to input resistance R1 of VIN of an operational amplifier OP1 at the first stage (R2/R1). When R1>R2, the range is reduced; when R1=R2, the range remains unchanged; when R1<R2, the range is enlarged. With a non-inverting input terminal of an operational amplifier OP2 at the following stage as external input terminal VW, if VW<0, a shift is made in the negative direction; if VW=0, no shift is made; if VW>0, a shift is made in the positive direction. As a result, x=−(R2/R1)·VIN is output to point x. This circuit is a place where scaling is performed. The output result is input to an inverting input terminal of the operational amplifier OP2 with voltage amplification degree 1, and external voltage VW for level shifting is applied to the non-inverting input terminal, thereby enabling level shifting. As a result, 2VW+(R2/R1)· is output to $V_{out}$. Any desired scaling and level shifting can be accomplished by changing the resistance value of feedback resistor R2 and voltage VW.

The circuit in FIG. 5 is a circuit for shifting and enlarging or reducing at a time with an operational amplifier OP3 at the first stage. In the circuit, the operational amplifier OP3 amplifies an input signal to a non-inverting terminal at amplification factor $A_V$ =R5/R4 determined by the ratio of resistance R5 to resistance R4. On the other hand, variable external voltage VW is input to an inverting input terminal of OP3. Level shifting and scaling can be performed at the same time. Thus, (1+R5/R4)·VIN−(R5/R4)·VW is output to point x. An operational amplifier OP4 at the following stage is a buffer amplifier and a through circuit where the polarity is not converted. Therefore, the same output values can be provided at $V_{out}$ and point x. Any desired scaling and level shifting can be performed by changing the resistance value of feedback resistor R5 and voltage VW.

For the fuzzy inference unit according to the embodiment, the scaling and level shift circuits 10 and 60 together with the fuzzy inference system 100 are built in one LSI (or IC). This eliminates the need for providing another interface for level adjustments, etc. The scaling and level shift amounts at the scaling and level shift circuits 10 and 60 are adjusted by inputting external signals.

What is claimed is:

1. A fuzzy inference unit, comprising:

a scaling circuit for increasing or decreasing a range of an input voltage value;

a shifting circuit connected to the scaling circuit for shifting a level of the input voltage value; and a fuzzy circuit for receiving the scaled and shifted input voltage value.

2. The fuzzy inference unit as claimed in claim 1 wherein said scaling circuit comprises an amplifier whose amplification factor is variable.

3. The fuzzy inference unit as claimed in claim 2 wherein said scaling circuit comprises an operational amplifier having an inverting input terminal to which the input voltage value is applied and an output terminal which is connected to the inverting input terminal via a feedback resistor, the feedback resistor having a variable resistance.

4. The fuzzy inference unit as claimed in claim 3 wherein said shifting circuit comprises an operational amplifier having an inverting input terminal to which an output of said scaling circuit is connected and a non-inverting input terminal to which a predetermined, variable offset voltage is applied.

5. The fuzzy inference unit as claimed in claim 1 wherein said scaling circuit and said shifting circuit comprises an operational amplifier having a non-inverting input terminal to which the input voltage value is applied, an inverting input terminal to which a predetermined, variable offset voltage is applied, and an output terminal which is connected to the inverting input terminal via a feedback resistor, the feedback resistor having a variable resistance.

6. The fuzzy inference unit as claimed in claim 5 wherein an output voltage of said operational amplifier is inputted into a buffer amplifier.

7. A fuzzy inference unit comprising:

a fuzzy circuit for receiving an input voltage value and for outputting an output voltage value;

a scaling circuit for increasing or decreasing a range of the output voltage value; and a shifting circuit connected to the scaling circuit for shifting a level of the output voltage value.

8. The fuzzy inference unit as claimed in claim 7 wherein said scaling circuit is an amplifier whose amplification factor is variable.

9. The fuzzy inference unit as claimed in claim 8 wherein said scaling circuit comprises an operational amplifier having an inverting input terminal to which the output voltage value is applied and an output terminal which is connected to the inverting input terminal via a feedback resistor, the feedback resistor having a variable resistance.

10. The fuzzy inference unit as claimed in claim 9 wherein said shifting circuit comprises an operational amplifier having an inverting input terminal to which an output of said scaling circuit is connected and a non-inverting input terminal to which a predetermined, variable offset voltage is applied.

11. The fuzzy inference unit as claimed in claim 10 wherein said scaling circuit and said shifting circuit comprise an operational amplifier having a non-inverting input terminal to which the output voltage value is applied, an inverting input terminal to which a predetermined, variable offset voltage is applied and an output terminal which is connected to the inverting input terminal via a feedback resistor, the feedback resistor having a variable resistance.

12. The fuzzy inference unit as claimed in claim 11 wherein an output voltage of said operational amplifier is inputted into a buffer amplifier.

13. A fuzzy inference unit, comprising:

an input-side scaling circuit for increasing or decreasing a range of an input voltage value;

an input-side shifting circuit connected to the input-side scaling circuit for shifting a level of the input voltage value;

a fuzzy circuit for receiving the scaled and shifted input voltage value and for outputting an output voltage value;

an output-side scaling circuit for increasing or decreasing a range of the output voltage value; and an output-side shifting circuit connected to the output-side scaling circuit for shifting a level of the output voltage value.

14. The fuzzy inference unit as claimed in claim 13 wherein said input-side scaling circuit and said output-side scaling circuit each comprise an amplifier, the amplifier having an amplification factor which is variable.

15. The fuzzy inference unit as claimed in claim 14 wherein said input-side scaling circuit and said output-side scaling circuit each comprise an operational amplifier having an inverting input terminal to which the input voltage value is applied and an output terminal which is connected to the inverting input terminal via a feedback resistor, the feedback resistor having a variable resistance.

16. The fuzzy inference unit as claimed in claim 15 wherein said input-side shifting circuit and said output-side shifting circuit each comprise an operational amplifier having an inverting input terminal to which an output of said input-side scaling circuit is connected and a non-inverting input terminal to which a predetermined, variable offset voltage is applied.

17. The fuzzy inference unit as claimed in claim 13 wherein said input-side scaling circuit, said output-side scaling circuit, said input-side shifting circuit and said output-side shifting circuit each comprise an operational amplifier having a non-inverting input terminal to which the input voltage value is applied, an inverting input terminal to which a predetermined, variable offset voltage is applied, and an output terminal which is connected to the inverting input terminal via a feedback resistor, the feedback resistor having a variable resistance.

18. The fuzzy inference unit as claimed in claim 17 wherein an output voltage of said operational amplifier is inputted into a buffer amplifier.

* * * * *